US010850875B2

(12) United States Patent
Abbas et al.

(10) Patent No.: US 10,850,875 B2
(45) Date of Patent: Dec. 1, 2020

(54) HANDLING SNACK FOOD CHIPS

(71) Applicant: Frito-Lay Trading Company GmbH, Berne (CH)

(72) Inventors: Bob Abbas, Rugby (GB); Michael Brandt, Lahnau (DE); Jan Christopher Fuller, Lahnau (DE)

(73) Assignee: Frito-Lay Trading Company GmbH, Berne (CH)

( * ) Notice: Subject to any disclaimer, the term of this patent is extended or adjusted under 35 U.S.C. 154(b) by 151 days.

(21) Appl. No.: 16/323,655

(22) PCT Filed: Aug. 8, 2017

(86) PCT No.: PCT/EP2017/070100
§ 371 (c)(1),
(2) Date: Feb. 6, 2019

(87) PCT Pub. No.: WO2018/029207
PCT Pub. Date: Feb. 15, 2018

(65) Prior Publication Data
US 2019/0202583 A1     Jul. 4, 2019

(30) Foreign Application Priority Data
Aug. 11, 2016   (GB) .................................. 1613814.1

(51) Int. Cl.
*B65B 5/06*        (2006.01)
*A21C 9/08*        (2006.01)
(Continued)

(52) U.S. Cl.
CPC .............. *B65B 5/064* (2013.01); *A21C 9/085* (2013.01); *A21C 9/086* (2013.01); *B65B 35/243* (2013.01);
(Continued)

(58) Field of Classification Search
CPC ...... B65G 15/16; B65G 15/105; B65G 15/14; B65G 47/252; B65G 47/261; B65G 47/31;
(Continued)

(56) References Cited

U.S. PATENT DOCUMENTS 2,112,309 A * 3/1938 Santillan .................. A21B 5/08
99/339
2,152,939 A    4/1939 Wentworth
(Continued)

FOREIGN PATENT DOCUMENTS

DE    4444000 A1 * 6/1996   ........... B65G 47/252
EP    1403196 A1    3/2004
(Continued)

OTHER PUBLICATIONS

PCT Search Report and Written Opinion for PCT/EP2017/070100 dated Dec. 4, 2017 (12 pages).

*Primary Examiner* — Mark A Deuble
(74) *Attorney, Agent, or Firm* — Barnes & Thornburg LLP; G. Peter Nichols

(57) ABSTRACT

An apparatus for handling three-dimensionally curved snack food chips. The apparatus includes a first conveyor for conveying a series of the snack food chips on a conveying surface and an inverting station located at an output end of the first conveyor. The inverting station includes an inverter configured for transferring the snack food chips from an output end of the first conveyor into contact with an internal concave surface of the inverter. A drive system for the inverter is configured to move the internal concave surface downwardly to cause movement of the snack food chips downward from an upper portion to a lower portion of the internal concave surface. A depositing station is located and configured for depositing the snack food chips from the lower portion of the internal concave surface onto a second (Continued)

conveyor configured for receiving snack food chips from the depositing station and conveying them away.

24 Claims, 2 Drawing Sheets

(51) Int. Cl.
| | |
|---|---|
| B65B 35/24 | (2006.01) |
| B65B 35/44 | (2006.01) |
| B65B 35/50 | (2006.01) |
| B65B 35/56 | (2006.01) |
| B65G 47/252 | (2006.01) |
| B65G 47/31 | (2006.01) |
| B65G 15/10 | (2006.01) |
| B65G 47/26 | (2006.01) |
| B65G 15/16 | (2006.01) |

(52) U.S. Cl.
CPC .............. *B65B 35/44* (2013.01); *B65B 35/50* (2013.01); *B65B 35/56* (2013.01); *B65G 15/105* (2013.01); *B65G 47/252* (2013.01); *B65G 47/261* (2013.01); *B65G 47/31* (2013.01); *B65G 15/16* (2013.01); *B65G 2201/0202* (2013.01)

(58) Field of Classification Search
CPC ....... B65B 35/243; B65B 35/50; B65B 35/44; B65B 35/56; B65B 5/064; A21C 9/085; A21C 9/086
See application file for complete search history.

(56) References Cited

U.S. PATENT DOCUMENTS

| | | | | |
|---|---|---|---|---|
| 2,822,942 | A | * 2/1958 | Lanham | ................... A21C 3/00 |
| | | | | 414/415 |
| 3,359,874 | A | 12/1967 | Stegenga | |
| 3,576,647 | A | 4/1971 | Liepa | |
| 3,677,391 | A | * 7/1972 | Schaeffer | ................ B65B 35/50 |
| | | | | 198/462.2 |
| 3,883,283 | A | 5/1975 | Herrera | |
| 3,911,805 | A | 10/1975 | Baird | |
| 3,988,875 | A | * 11/1976 | Fay | ........................ A21C 11/10 |
| | | | | 53/514 |
| 4,082,176 | A | * 4/1978 | Pommer | ................. B65B 5/064 |
| | | | | 198/411 |
| 4,309,938 | A | 1/1982 | Harmon | |
| 5,392,696 | A | * 2/1995 | Navarro | ................... A21B 1/48 |
| | | | | 198/403 |
| 5,423,414 | A | 6/1995 | Vaughn et al. | |
| 5,873,448 | A | 2/1999 | Tsai et al. | |
| 6,510,937 | B1 | 1/2003 | Braithwaite | |
| 7,264,107 | B2 * | 9/2007 | Lawrence | ................ A21C 9/08 |
| | | | | 198/404 |
| 2002/0034573 | A1 | 3/2002 | McNeel | |
| 2005/0077150 | A1 | 4/2005 | Dickinson | |

FOREIGN PATENT DOCUMENTS

| | | |
|---|---|---|
| EP | 1647216 A2 | 4/2006 |
| GB | 1419585 A | 12/1975 |

\* cited by examiner

HANDLING SNACK FOOD CHIPS

CROSS-REFERENCE TO RELATED APPLICATIONS

This application is a US 371 Application from PCT/EP2017/070100 filed Aug. 8, 2017, which claims priority to GB Application 1613814.1 filed Aug. 11, 2016, the technical disclosures of which are hereby incorporated by reference in their entirety.

BACKGROUND

1. Field of the Invention

The present invention relates to a method of and apparatus for handling a plurality of snack food chips. The present invention particularly relates to the handling of three-dimensionally shaped snack food chips prior to packaging of a stack of the three-dimensionally shaped seasoned snack food chips in a packaging container.

2. Description of the Related Art

The manufacture of snack food chips well known. A variety of different snack food chips is known having various shapes and configurations, and compositions.

It is known to manufacture three-dimensionally shaped snack food chips which are then shingled to form a shingled assembly which can then be packaged as a stack of three-dimensionally shaped snack food chips in a packaging container. The chips are topically seasoned on an upper concave face, but then need to be inverted so as to be able reliably to form a shingled assembly in which the chips are mutually aligned. The inverting step is achieved by flipping, typically using a pneumatic air blower. Such flipping tends to have low production efficiency and high product waste, both of seasoning and of snack chips, in the form of broken and/or spilled snack food chips. When the three-dimensionally shaped snack food chip is triangular in plan, for example substantially equilateral, as is known for tortilla chips, it is difficult to orient and align the triangular chips so that a shingled assembly is reliably achieved which can then be reliably packaged.

There is a need in the art to provide a method of and apparatus for handling three-dimensionally shaped snack food chips which can then be packaged as a stack of three-dimensionally shaped snack food chips in a packaging container that can provide high production efficiency and reduced product waste, both of seasoning and of snack chips, in the form of broken and/or spilled snack food chips. There is also a need in the art to provide such a method and apparatus which can implemented in a snack food chip manufacturing line in a cost-effective manner with regard to both capital costs and production costs.

The present invention aims at least partially to meet those needs.

SUMMARY

The present invention accordingly provides a method of handling three-dimensionally curved snack food chips, the method comprising the steps of:

a) providing a plurality of three-dimensionally curved snack food chips, each three-dimensionally curved snack food chip having a convex face and an opposite concave face;

b) conveying, by a first conveyor extending along a conveying direction, a series of the snack food chips to an inverting station located at an output end of the first conveyor, the snack food chips in the series being aligned along the conveying direction, the first conveyor having a first upper conveying surface engaging the convex face of the snack food chips, and the opposite concave face of the snack food chips being upwardly oriented;

c) at the inverting station, sequentially transferring the snack food chips in the series from the first conveyor to an inverter, the inverter comprising an internal concave surface having an upper portion and a lower portion, the snack food chips being transferred from the output end of the first conveyor into contact with the upper portion of the internal concave surface, the concave face of each snack food chip being oriented towards the internal concave surface of the inverter;

d) in the inverter, sequentially moving the snack food chips downwardly from the upper portion to the lower portion of the internal concave surface by downward movement of the internal concave surface of the inverter; and e) at a depositing station, sequentially depositing the snack food chips downwardly from the lower portion of the internal concave surface onto a second conveyor, the concave face of each snack food chip being oriented downwardly towards a second upper conveying surface of the second conveyor; and f) conveying, by the second conveyor, the snack food chips on the second upper conveying surface away from the depositing station.

The present invention further provides an apparatus for handling three-dimensionally curved snack food chips, the apparatus comprising:

a first conveyor extending along a conveying direction for conveying a series of the snack food chips on a first upper conveying surface of the first conveyor;

an inverting station located at an output end of the first conveyor, the inverting station including an inverter comprising an internal concave surface having an upper portion and a lower portion, the inverter and first conveyor being arranged for sequentially transferring the snack food chips in the series from the output end of the first conveyor into contact with the upper portion of the internal concave surface, a drive system for the inverter, the drive system being arranged to move the internal concave surface of the inverter downwardly thereby to cause sequential movement of the snack food chips in the series downwardly from the upper portion to the lower portion of the internal concave surface;

a depositing station located beneath the lower portion of the internal concave surface, the depositing station being arranged for sequentially depositing the snack food chips in the series downwardly from the lower portion of the internal concave surface; and a second conveyor having a second upper conveying surface for receiving snack food chips in the series at the depositing station and for conveying the snack food chips in the series away from the depositing station.

Preferred features of these aspects of the present invention are defined in the dependent claims.

The preferred embodiments of the present invention can provide a method and apparatus for handling three-dimensionally shaped snack food chips, prior to packaging into a container, with reduced or minimal loss of seasoning which has been applied to the snack food chips.

The preferred embodiments of the present invention can further provide a low cost method and apparatus for handling such three-dimensionally shaped snack food chips which has low production costs as well as low capital expenditure. The conveying and inverting apparatus may be retrofitted to an existing snack food chip packaging production line.

Although the invention has particular application to the manufacture of shaped tortilla chips, the method of the present invention may be used to produce a variety of different snack food chip compositions, as well and shapes. For example, the snack food chip may comprise any cereal-based composition, and may comprise any of, any mixture of, or all of, maize, wheat, barley, rice or any other grain-derived product, as well as any seasoning, either within the cereal-based composition and/or applied as a topical seasoning. Alternatively, the snack food chip may comprise any vegetable-based composition, for example based on potato, either alone or in admixture with any other vegetable, or any cereal as described above.

The snack food chips may be provided with other product design features to improve eating quality, for example particular flavourings or texturizing components. The snack food chips are packaged so as to be provided in a consumer acceptable retail format, for example a packaging canister, tube or carton, typically hermetically sealed, which is compatible with a retail sales environment.

BRIEF DESCRIPTION OF THE DRAWINGS

Embodiments of the present invention will now be described by way of example only with reference to the accompanying drawing, in which.

DETAILED DESCRIPTION

Figure 1:
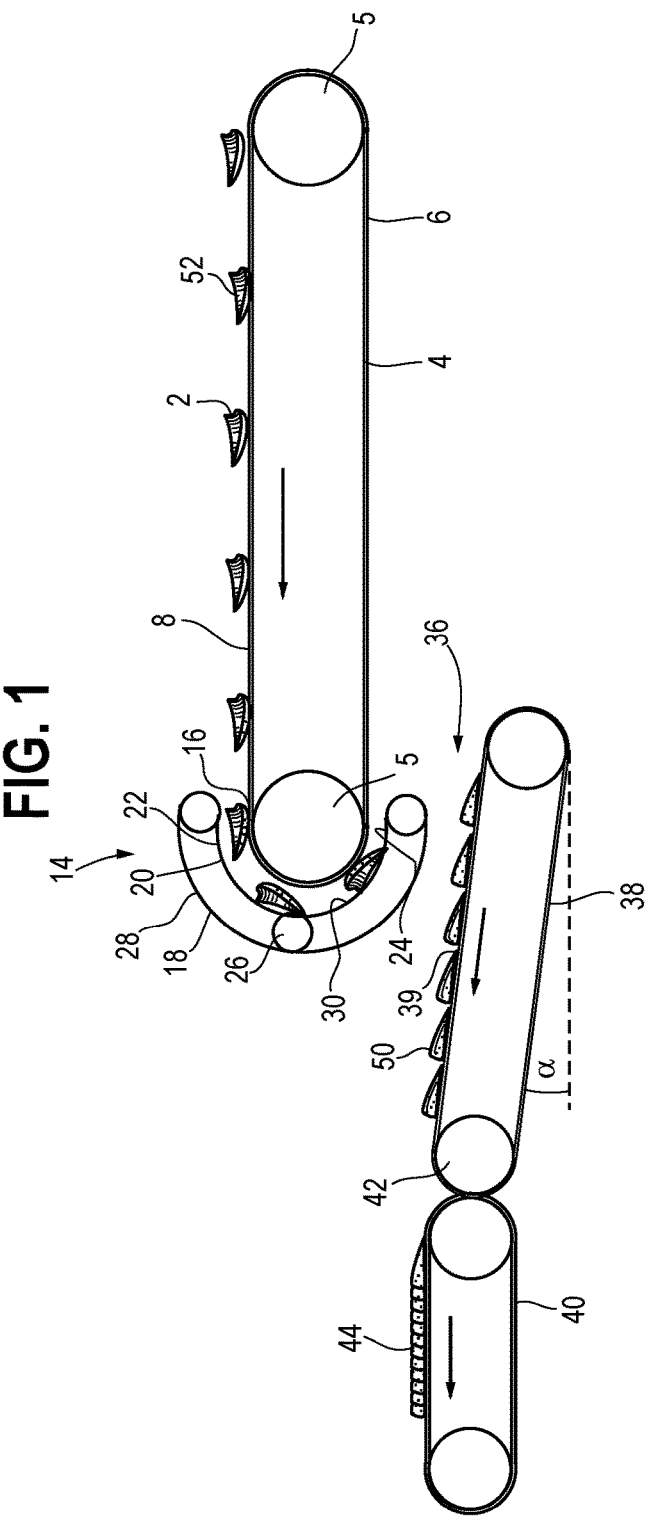
FIG. 1 schematically illustrates a side view of an apparatus for use in handling snack food chips in accordance with a first embodiment of the present invention.
Figure 2:
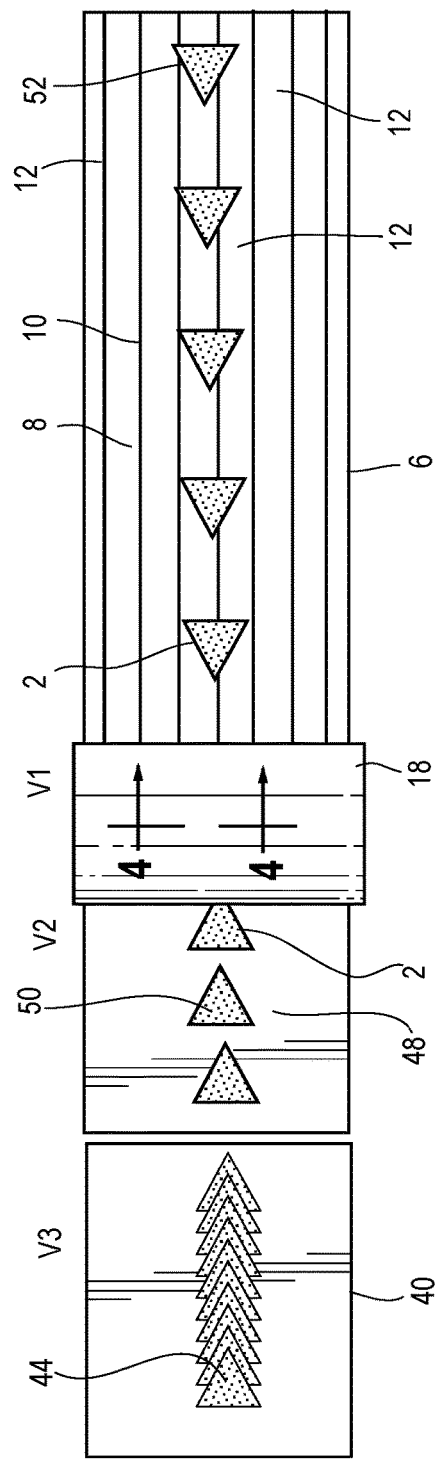
FIG. 2 schematically illustrates a plan view of the apparatus of FIG. 1.
Figure 3:
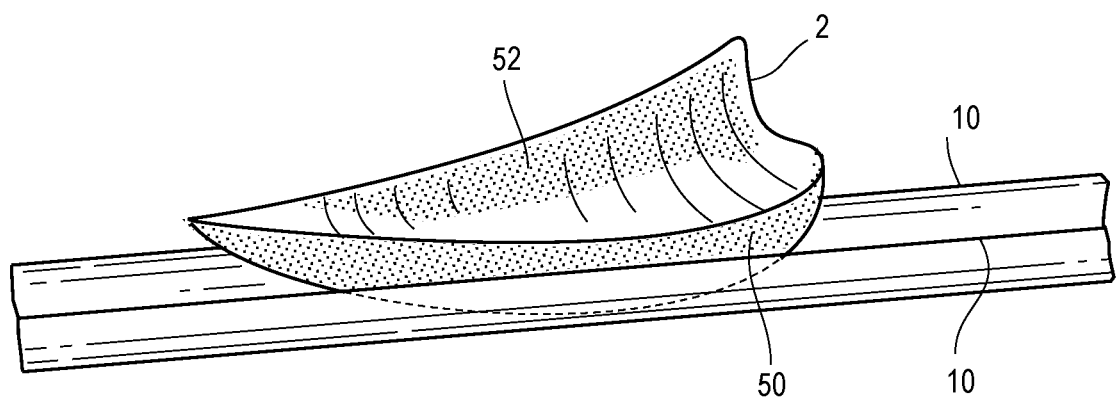
FIG. 3 is an enlarged perspective view of a snack food chip supported on the first conveyor of the apparatus of FIG. 1.

Referring to the Figures of the accompanying drawings, there is schematically shown an apparatus for use in a method for packaging snack food chips 2, in particular topically seasoned tortilla chips, in accordance with an embodiment of the present invention. The apparatus handles the snack food chips between a manufacturing station and a packaging station. The apparatus receives a line of the snack food chips and arranges them into a shingled configuration which can then be stacked into a packaging canister.

The snack food chips 2 may have any desired composition, and may include any cereal-based composition or vegetable-based composition suitable for making a snack food dough which may be subsequently cooked, for example by frying, baking, toasting, microwave cooking, or any other suitable cooking process, or any combination of cooking processes, to produce the desired taste and texture, for example a crispy texture, in the resultant chip. The dough may typically comprise a maize-based dough for the manufacture of snack food chips in the form of tortilla chips. A seasoning, which may be in powder and/or liquid form, may have been deposited onto one or more surfaces of the snack food chips.

The snack food chips 2 may be regularly shaped, for example being triangular, square, rectangular, elliptical, etc., or be irregularly shaped. Typically, the snack food chips have a surface area of from 1000 to 2500 $mm^2$ and a maximum dimension of from 30 to 100 mm.

The snack food chips 2 handled according to the present invention are three-dimensionally curved snack food chips. Each three-dimensionally curved snack food chip has a convex face 50 and an opposite concave face 52. Typically, the chips 2 are triangular in plan. Furthermore, the three-dimensionally shaped snack food chips 2 are shaped and dimensioned so as to be able to be shingled together and to form a stack. In a shingled assembly of a plurality of the snack food chips, a concave face 52 of a snack food chip 2 receives a convex face 50 of an adjacent snack food chip 2. The shingled assembly can then be oriented to form a stack which can then be stacked into a packaging container, such as an elongate canister. The snack food chips 2 may be shaped and dimensioned so as to be suitable for use together with a dip, such as a salsa composition, cream cheese, avocado composition, etc. which are well known in the snack food art.

The apparatus for handling three-dimensionally curved snack food chips 2 comprises a first conveyor 6, which is an endless belt conveyor including an endless belt 4 mounted between opposed rollers 5, for conveying a plurality of the snack food chips 2 in a conveying direction C. The first conveyor 6 extends along the conveying direction C and has a first upper conveying surface 8. The conveying direction C is typically linear, i.e. straight, but may be at least partly curved or serpentine. The first conveyor 6 is provided for conveying a series of the snack food chips 2, typically the series being linear.

The endless belt conveyor 6 comprises a plurality of mutually parallel support elements 10 defining at least one conveying lane 12 extending in the conveying direction C. The series of the snack food chips 2 is supported by at least two support elements 10 defining a respective conveying lane 12. The first conveyor 6 may convey plural parallel lines of snack food chips 2 in respective conveying lanes 12 in the conveying direction C. In the illustrated embodiment the support elements 10 comprise polymer cords which are endless and extend around the endless belt 4. The support elements 10 may be mutually spaced in the transverse direction, which is orthogonal to the conveying direction, so that a centre of gravity of the three-dimensional chip 2 is balanced so that the chip 2 is held at the correct orientation for delivery to the downstream operation.

An inverting station 14 is located at an output end 16 of the first conveyor 6. The inverting station 14 includes an inverter 18 comprising an internal concave surface 20 having an upper portion 22 and a lower portion 24. The internal concave surface 20 is substantially semi-circular in cross-section. The inverter 18 and first conveyor 6 are arranged for sequentially transferring the snack food chips 2 in the series from the output end 16 of the first conveyor 6 into contact with the upper portion 22 of the internal concave surface 20. A drive system 26 for the inverter 18 is arranged to move the internal concave surface 20 of the inverter downwardly thereby to cause sequential movement of the snack food chips 2 downwardly from the upper portion 22 to the lower portion 24 of the internal concave surface 20. The inverter 18 comprises an arcuate endless belt 28, typically of an elastomeric material such as a synthetic rubber, having an inner arcuate surface 30 which defines the internal concave surface 20. The arcuate endless belt 28 is rotatable by the drive system 26 to cause the downward movement of the internal concave surface 20 of the inverter 18.

Figure 4:
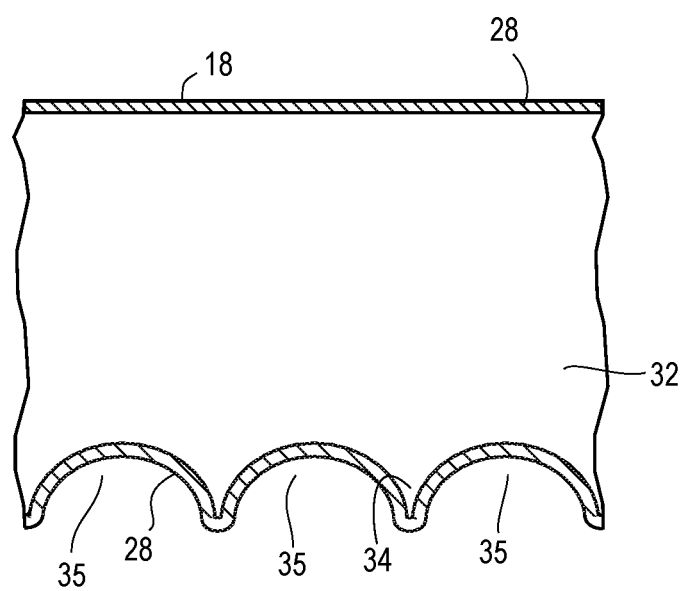
FIG. 4 is a cross-section on line 4.4 through the apparatus of FIG. 1 as shown in FIG. 2.

As shown in particular in FIG. 4, the inverter 18 further comprises a guide 32 extending along the internal concave surface 20 from the upper portion 22 to the lower portion 24. The guide 32 comprises a plurality of guide elements 34 on the inner arcuate surface 30 which are mutually spaced transversely across the inverter 18 and extend in a downwardly direction from the upper portion 22 to the lower portion 24. The guide elements 34 define respective parallel arcuate grooves 35 which extend from the upper portion 22 to the lower portion 24. Each series of snack food chips 2 is fed from a respective conveying lane 12 on the first conveyor 6 into a respective arcuate groove 35 in the inverter 18.

A depositing station 36 is located beneath the lower portion 24 of the internal concave surface 20. The depositing station 36 is arranged for sequentially depositing the snack food chips 2 in the series downwardly from the lower portion 24 of the internal concave surface 20.

A second conveyor 38, which comprises an endless belt conveyor, has a second upper conveying surface 39 for receiving snack food chips 2 in the series at the depositing station 36. The second conveyor 38 is provided for conveying the snack food chips 2 in the series away from the depositing station 36. The second conveyor 38 is upwardly inclined at an angle α from the depositing station 36. The second upper conveying surface 39 of the second conveyor 38 includes at least one orientation element 48 which is shaped and dimensioned to fit within a concave face 52 of a respective snack food chip 2. The orientation element 48 is elongate and extends along the second conveying surface 39.

The drive system 26 of the inverter 18 is adapted to move the internal concave surface of the inverter downwardly at a first linear velocity V1 in a moving direction D of the internal concave surface 20 of the inverter 18. The second conveyor 38 is adapted to move at a second linear velocity V2. The first linear velocity V1 is higher than the second linear velocity V2.

A third conveyor 40 is located at an output end 42 of the second conveyor 38 and the second conveyor 38 is arranged for transferring the series of snack food chips 2 onto the third conveyor 40. The third conveyor 40 is adapted to move at a third linear velocity V3. The second linear velocity V2 is higher than the third linear velocity V3.

In use, the apparatus is employed in a method of handling the three-dimensionally curved snack food chips 2. In the method, a plurality of the three-dimensionally curved snack food chips 2 is conveyed as a series by the first conveyor 6 along the conveying direction C to the inverting station 14. The snack food chips 2 in the series, which series is preferably linear, are aligned along, and typically mutually spaced in, the conveying direction C. The first upper conveying surface 8 engages the convex face 50 of the snack food chips 2, and the opposite concave face 52 of the snack food chips 2 is upwardly oriented. At the inverting station 14, the snack food chips 2 in the series are sequentially transferred from the first conveyor 6 to the inverter 18. The snack food chips 2 are transferred from the output end 16 of the first conveyor 6 into contact with the upper portion 22 of the internal concave surface 20. Initially, the chips 2 are carried on the support elements 10 and then as the chips 2 rotate around the inverter the chips 2 are supported by the internal concave surface 20. The concave face 52 of each snack food chip 2 is oriented towards the internal concave surface 20 of the inverter 18. The inverter 18 sequentially moves the snack food chips 2 downwardly from the upper portion 22 to the lower portion 24 of the internal concave surface 20 by downward movement of the internal concave surface 20 of the inverter 18. The arcuate endless belt 28 is rotated to cause the downward movement of the internal concave surface 20 of the inverter 18. The snack food chips 2 travel in the grooves 35.

At the depositing station 36, the snack food chips 2 in the series are sequentially deposited downwardly from the lower portion 24 of the internal concave surface 20 onto the second conveyor 38. At the depositing station 36 the second conveyor 38 is spaced below the inverter 18 so that at the depositing station 36 the snack food chips 2 are dropped onto the second conveyor 38 from the inverter 18. The inverter 18 and the second conveyor 38 are adapted to be driven in opposite directions so that a horizontal translational component of the direction of movement of the snack food chips 2 is reversed when the snack food chips 2 are deposited on the second conveyor 38 from the inverter 18. The orientation elements 48 are received within a respective concave face 52 of a respective snack food chip 2.

The concave face 52 of each snack food chip 2 is oriented downwardly towards the second upper conveying surface 39 of the second conveyor 38. The series of the snack food chips 2 is deposited so as to be located over a respective orientation element 48 so that the series is maintained along a line in registry with the orientation element 48. The second conveyor 38 conveys the snack food chips 2 in the series on the second upper conveying surface 39 away from the depositing station 36. The series of snack food chips 2 is then transferred from the second conveyor 38 onto the third conveyor 40 located at the output end 42 of the second conveyor 38.

By providing that the first linear velocity V1 is higher than the second linear velocity V2, the snack food chips 2 in the series are closer together on the second conveyor 38 than in the inverter 18. By providing that the second linear velocity V2 is higher than the third linear velocity V3, the snack food chips 2 in the series are closer together on the third conveyor than in the second conveyor.

In one embodiment, as illustrated a shingled assembly 44 is formed on the third conveyor 40 when the snack food chips 2 are transferred onto the third conveyor 40 by the second conveyor 38.

In another embodiment, the snack food chips 2 in the series on the second conveyor 38 comprises a shingled assembly 44 of the series of the snack food chips 2. The shingled assembly 44 is formed on the second conveyor 38 at the depositing station 36.

The third conveyor 40 conveys the shingled assembly 44 of the plurality of snack food chips 2 to a stacking station. A stacking system at the stacking station forms a stack, typically a vertical stack, of the snack food chips and then loads the stack into a container, such as a canister.

The preferred embodiments of the present invention provide a number of technical advantages and effects. The velocity of the chips can be readily controlled to ensure reliable inversion while maintaining the alignment of the chips to facilitate subsequent shingling and stacking. Chip breakage and seasoning loss can be minimised. The present invention particularly effective at inverting and aligning three-dimensionally curved chips having a non-uniform shape.

Various other modifications to the apparatus and method of the present invention will be readily apparent to those skilled in the art.

The invention claimed is:

1. A method of handling three-dimensionally curved snack food chips that are substantially triangular in plan, the method comprising the steps of:
   a) providing a plurality of three-dimensionally curved snack food chips, each three-dimensionally curved snack food chip having a convex face and an opposite concave face;
   b) conveying, by a first conveyor extending along a conveying direction, a series of the snack food chips to an inverting station located at an output end of the first conveyor, the snack food chips in the series being aligned along the conveying direction, the first conveyor having a first upper conveying surface engaging the convex face of the snack food chips, and the opposite concave face of the snack food chips being upwardly oriented;
   c) at the inverting station, sequentially transferring the snack food chips in the series from the first conveyor to an inverter, the inverter comprising an internal concave surface having an upper portion and a lower portion, wherein the inverter comprises an arcuate endless belt having an inner arcuate surface which defines the internal concave surface, the snack food chips being transferred from the output end of the first conveyor into contact with the upper portion of the internal concave surface, the concave face of each snack food chip being oriented towards the internal concave surface of the inverter;
   d) in the inverter, rotating the arcuate endless belt to cause downward movement of the internal concave surface of the inverter thereby sequentially moving the snack food chips in contact with the rotating arcuate endless belt downwardly from the upper portion to the lower portion of the internal concave surface; and
   e) at a depositing station, sequentially depositing the snack food chips downwardly from the lower portion of the internal concave surface onto a second conveyor, the concave face of each snack food chip being oriented downwardly towards a second upper conveying surface of the second conveyor, wherein a horizontal translational component of the direction of movement of the snack food chips is reversed when the snack food chips are deposited on the second conveyor from the inverter and wherein the inverter downwardly moves the snack food chips at a first velocity in a moving direction of the internal concave surface of the inverter and the second conveyor has a second velocity, wherein the first velocity is higher than the second velocity so that the snack food chips in the series are closer together on the second conveyor than in the inverter, wherein the snack food chips in the series on the second conveyor comprise a shingled assembly of the series of the snack food chips and wherein the shingled assembly of the snack food chips is formed on the second conveyor at the depositing station; and
   f) conveying, by the second conveyor, the snack food chips on the second upper conveying surface away from the depositing station.

2. A method according to claim 1 wherein the first conveyor comprises an endless belt conveyor.

3. A method according to claim 2 wherein the endless belt conveyor of the first conveyor comprises a plurality of mutually parallel support elements defining at least one conveying lane extending in the conveying direction, the series of the snack food chips being supported by at least two endless support elements defining a respective conveying lane.

4. A method according to claim 1 wherein the inverter further comprises a guide extending along the internal concave surface from the upper portion to the lower portion.

5. A method according to claim 4 wherein the guide comprises a plurality of guide elements on the internal concave surface which are mutually spaced transversely across the direction from the upper portion to the lower portion, the guide elements defining at least one arcuate groove which extends from the upper portion to the lower portion, and the series of snack food chips is moved in the arcuate groove from the upper portion to the lower portion.

6. A method according to claim 1 wherein the internal concave surface is substantially semi-circular in cross section.

7. A method according to claim 1 wherein the second conveyor comprises an endless belt conveyor.

8. A method according to claim 1 wherein the second conveyor is upwardly inclined from the depositing station.

9. A method according to claim 1 wherein at the depositing station the snack food chips are dropped onto the second conveyor.

10. A method according to claim 1 wherein the second upper conveying surface of the second conveyor includes at least one orientation element which is shaped and dimensioned to fit within a concave face of a respective snack food chip and in step (e) a series of the snack food chips is deposited so as to be located over a respective orientation element.

11. A method according to claim 1 wherein in step (a) the snack food chips in the series on the first conveyor are mutually spaced in the conveying direction.

12. A method according to claim 1 wherein the snack food chips have been topically seasoned prior to step (a).

13. A method according to claim 1 wherein the snack food chips are substantially triangular in plan.

14. A method according to claim 1 wherein the snack food chips are tortilla chips.

15. An apparatus for handling three-dimensionally curved snack food chips that are substantially triangular in plan, the apparatus comprising:
   a first conveyor extending along a conveying direction for conveying a series of the snack food chips on a first upper conveying surface of the first conveyor;
   an inverting station located at an output end of the first conveyor, the inverting station including an inverter comprising an internal concave surface having an upper portion and a lower portion, wherein the inverter comprises an arcuate endless belt having an inner arcuate surface which defines the internal concave surface, the inverter and first conveyor being arranged for sequentially transferring the snack food chips in the series from the output end of the first conveyor into contact with the upper portion of the internal concave surface, a drive system for the inverter, the arcuate endless belt being rotatable by the drive system to cause the downward movement of the internal concave surface of the inverter, thereby to cause sequential movement of the snack food chips in the series downwardly from the upper portion to the lower portion of the internal concave surface;
   a depositing station located beneath the lower portion of the internal concave surface, the depositing station being arranged for sequentially depositing the snack food chips in the series downwardly from the lower portion of the internal concave surface; and a second conveyor having a second upper conveying surface for receiving snack food chips in the series at the depositing station and for conveying the snack food chips in the series away from the depositing station, wherein the inverter and the second conveyor are adapted to be driven so that a horizontal translational component of the direction of movement of the snack food chips is reversed when the snack food chips are deposited on the second conveyor from the inverter, and the drive system of the inverter is adapted to move the internal concave surface of the inverter at a first velocity in a moving direction of the internal concave surface of the inverter and the second conveyor is adapted to move at a second velocity, wherein the first velocity is higher than the second velocity;

wherein the apparatus is adapted to output a shingled assembly of the series of the snack food chips downstream, with respect to a flow of the snack food chips through the apparatus, of the depositing station; and wherein the apparatus is adapted to form the shingled assembly of the series of the snack food chips on the second conveyor at the depositing station.

16. An apparatus according to claim 15 wherein the first conveyor comprises an endless belt conveyor.

17. An apparatus according to claim 16 wherein the endless belt conveyor of the first conveyor comprises a plurality of mutually parallel support elements defining at least one conveying lane extending in the conveying direction, the series of the snack food chips being supported by at least two endless support elements defining a respective conveying lane.

18. An apparatus according to claim 15 wherein the inverter further comprises a guide extending along the internal concave surface from the upper portion to the lower portion.

19. An apparatus according to claim 18 wherein the guide comprises a plurality of guide elements on the internal concave surface which are mutually spaced transversely across the direction from the upper portion to the lower portion, the guide elements defining at least one arcuate groove which extends from the upper portion to the lower portion.

20. An apparatus according to claim 15 wherein the internal concave surface is substantially semi-circular in cross section.

21. An apparatus according to claim 15 wherein the second conveyor comprises an endless belt conveyor.

22. An apparatus according to claim 15 wherein the second conveyor is upwardly inclined from the depositing station.

23. An apparatus according to claim 15 wherein at the depositing station the second conveyor is spaced below the inverter so that at the depositing station the snack food chips are dropped onto the second conveyor from the inverter.

24. An apparatus according to claim 15 wherein the second upper conveying surface of the second conveyor includes at least one orientation element which is shaped and dimensioned to fit within a concave face of a respective snack food chip.

* * * * *